(12) United States Patent
Lobato et al.

(10) Patent No.: US 8,718,975 B2
(45) Date of Patent: May 6, 2014

(54) SURFACE PROFILE EVALUATION (75) Inventors: Hugo M P Lobato, Derby (GB); Ian R Gower, Chepstow (GB); Christopher A Powell, Cardiff (GB); Nicholas B Orchard, Bristol (GB)

(73) Assignee: Rolls-Royce, PLC, London (GB)

( * ) Notice: Subject to any disclaimer, the term of this patent is extended or adjusted under 35 U.S.C. 154(b) by 328 days.

(21) Appl. No.: 13/202,358

(22) PCT Filed: Feb. 24, 2010

(86) PCT No.: PCT/EP2010/001144
§ 371 (c)(1),
(2), (4) Date: Aug. 19, 2011

(87) PCT Pub. No.: WO2010/099890
PCT Pub. Date: Sep. 10, 2010

(65) Prior Publication Data
US 2011/0301915 A1 Dec. 8, 2011

(30) Foreign Application Priority Data
Mar. 2, 2009 (GB) .................................. 0903404.2

(51) Int. Cl.
*G06F 15/00* (2006.01)
(52) U.S. Cl.
USPC .................. 702/167; 416/223 A; 416/223 R; 416/DIG. 2; 416/DIG. 5; 415/161; 415/191
(58) Field of Classification Search
USPC ............ 702/167; 416/223 A, 223 R, DIG. 2, 416/DIG. 5; 415/161, 191
See application file for complete search history.

(56) References Cited

U.S. PATENT DOCUMENTS

| | | | |
|---|---|---|---|
| 5,474,425 A * | 12/1995 | Lawlor ...................... | 416/223 R |
| 5,500,737 A | 3/1996 | Donaldson et al. | |
| 6,588,285 B1 * | 7/2003 | Vozhdaev et al. .......... | 73/861.65 |
| 7,018,174 B2 * | 3/2006 | Senoo et al. .................. | 415/191 |
| 7,094,034 B2 * | 8/2006 | Fukuda et al. ............ | 416/223 A |

(Continued)

FOREIGN PATENT DOCUMENTS

| | | |
|---|---|---|
| DE | 102 58 493 B4 | 11/2009 |
| EP | 0 526 075 A2 | 2/1993 |

(Continued)

OTHER PUBLICATIONS

British Search Report issued in British Application No. GB0903404.2 on Jul. 3, 2009.

(Continued)

*Primary Examiner* — Carol S Tsai
(74) *Attorney, Agent, or Firm* — Oliff PLC (57) ABSTRACT

A method and system for accepting or rejecting a curved surface of a body under evaluation involves conducting a comparison between the curvature of a surface profile for the surface under evaluation and higher and lower curvature tolerance boundaries. The higher and lower curvature tolerance boundaries are determined from a desired surface profile. The curvature at a plurality of locations on the curve profile under evaluation may be defined with reference to a geometric variable for said curved surface and may be plotted on a graph. The higher and lower curvature tolerance boundaries may also be plotted on the graph so as to determine whether the plot of curvature for the surface under evaluation falls within the bounds of the higher and lower tolerance boundaries.

20 Claims, 5 Drawing Sheets (56) References Cited

U.S. PATENT DOCUMENTS

| | | | |
|---|---|---|---|
| 8,113,786 B2* | 2/2012 | Spracher et al. | 416/223 R |
| 8,142,162 B2* | 3/2012 | Godsk et al. | 416/223 R |
| 8,197,218 B2* | 6/2012 | Tangler et al. | 416/238 |
| 2004/0057057 A1* | 3/2004 | Isaacs et al. | 356/601 |
| 2005/0106998 A1* | 5/2005 | Lin et al. | 451/5 |
| 2005/0201611 A1* | 9/2005 | Lloyd et al. | 382/152 |
| 2006/0245918 A1* | 11/2006 | Senoo et al. | 415/191 |
| 2007/0005295 A1 | 1/2007 | Dusserre-Telmon et al. | |
| 2009/0123289 A1* | 5/2009 | Tangler et al. | 416/223 R |
| 2009/0202354 A1* | 8/2009 | Godsk et al. | 416/223 R |

FOREIGN PATENT DOCUMENTS

| | | |
|---|---|---|
| EP | 1 615 153 A2 | 1/2006 |
| EP | 1 921 417 A1 | 5/2008 |
| GB | 2 283 093 A | 4/1995 |
| GB | 2 295 890 A | 6/1996 |

OTHER PUBLICATIONS

International Search Report issued in International Application No. PCT/EP2010/001144 on Jul. 8, 2010.

Written Opinion of the International Searching Authority issued in International Application No. PCT/EP2010/001144 on Jul. 8, 2010.

* cited by examiner

SURFACE PROFILE EVALUATION

The present invention relates to a method and system for evaluation of a surface profile and more particularly, although not exclusively, to evaluation of a curved surface profile, such as, for example, a surface of an airfoil.

For a number of products having a complex curved surface, the optimal design of the surface is an important factor. This is particularly the case where fluid flow over the surface in question needs to be assessed for optimising aerodynamic performance of the product. Slight variations in curvature over a surface of this kind can have a significant impact on operational performance.

Whilst the following description proceeds with reference to aerofoils and, in particular, aerofoils within gas turbine engines, it is to be understood that the system and method of the present invention may be applied to any curved surface which is to be evaluated for conformity to a precise surface profile. Aside from various fluid dynamics applications, such complex curved surfaces may be encountered in, for example, medical devices, such as implants; optical devices, such as lenses; and other ergonomic or artistic designs.

The assessment of conformity of an aerofoil surface is conventionally done by comparing a set of measured data points to the nominal design profile requirements or optimal design. The design profile has a tolerance band within which the data points must lie in order for the blade to be deemed acceptable. Deviations from optimal design can result in an undesirable reduction in engine efficiency and in certain situations could lead to engine stall or compressor surge. The assessment of form is independent of the assessment of edge position, so it is normal practice to do some form of best fitting of the measured data to the nominal data before making the assessment.

In a conventional system, the assessment of blade's leading edge profile is typically a manual process, in which an experienced inspector judges a captured profile against pre-determined nominal shapes to decide if the airfoil profile meets the required specification. The inspector then passes or fails the blade accordingly. The need for human intervention can cause a significant variation in the final result and hence the reliability of the evaluation process. In addition it is difficult to manually assess the gravity of specific deviations from the optimal design and whether such deviations will have a significant or relatively insignificant impact on the performance of the aerofoil.

The above problems have been addressed by the creation of parametric assessment tools. However known methods of parametric assessment have failed to take full account of critical features in the vicinity of the leading and/or trailing edge of an aerofoil. One such feature is the bias at the point of greatest curvature (i.e. the orientation of the point of greatest curvature relative to the concave or convex surface of an aerofoil). According to known evaluation methods, separate procedures may be required to highlight such features.

Problems can occur in known parametric assessment methods in that the selected methods for parameterisation can artificially affect the evaluation of the surface.

In addition, certain known assessment methods are applicable only to a subset of curved surfaces and cannot reliably be applied to all possible airfoil profiles. It has been found that conventional Geometric Dimensioning and Toleranceing (GD&T) standards, which are typically used to define the required form of a curved surface in terms of radii, can prove problematic when attempting to define small radii or else that such a determination can carry a high level of uncertainty.

It is an aim of the present invention to provide an improved method and system for evaluating curved surface profiles which is broadly and reliably applicable.

According to one aspect of the present invention there is provided a method of evaluating a curved surface, comprising defining a desired surface profile for at least a portion of a desired curved surface, establishing a surface profile for a surface under evaluation, determining the curvature of the surface under evaluation at a plurality of locations on said surface profile, determining higher and lower curvature tolerance boundaries based upon the desired surface profile, and, rejecting the surface under evaluation if any of the determined curvature values are outside of the region between the higher and lower curvature tolerance boundaries.

The curvature values determined and compared according to the present invention typically comprise the true curvature.

According to one embodiment, the determining of the curvature of the surface profile under evaluation comprises defining the curvature at the plurality of locations with reference to a reference variable for said curved surface. The reference variable may be based upon a geometric feature of the body. In one embodiment, the reference variable is a characteristic dimension of the body or surface under evaluation. The characteristic dimension may be a width or thickness or an arc length for a region of the body under evaluation. The reference variable may be a function of the characteristic dimension.

In one embodiment, the curvature of the surface profile under evaluation is plotted against the reference variable so as to produce a graph. The higher and/or lower curvature tolerance boundary may be plotted on the graph. The curvature for the desired surface profile may be determined and plotted on the graph.

The curvature for any or any combination of the higher tolerance boundary, the lower tolerance boundary and/or the desired surface profile may be determined for a plurality of locations on said desired surface profile. Said locations may be determined based upon the plurality of locations for the surface profile under evaluation. The reference variable at each of said locations may equal the reference variable for one of the plurality of locations on the surface profile under evaluation.

A comparison between the curvature values for the surface profile under evaluation and the higher and lower curvature tolerance boundaries may be carried out to determine whether the curvature for the surface profile under evaluation falls outside of the region between the higher and lower curvature tolerance boundaries. The comparison may be performed at known and/or predetermined values of said reference variable.

The acceptance or rejection of a surface according to the present invention may be automated. The surface under evaluation may be accepted if the curvature for the surface profile under evaluation falls between the higher and lower curvature tolerance boundaries for a region of the body under evaluation.

The comparison may be carried out with reference to said graph by determining one or more locations on said curvature plot for the surface profile under evaluation which lie outside of the area between the higher and lower tolerance boundary plots. A rejection of the body may be determined if the curvature plot for the surface profile under evaluation crosses the higher or lower tolerance boundary plot. An acceptance of the body may be determined if curvature plot for the surface profile under evaluation lies entirely within the area between the higher and lower tolerance boundary plots.

One or more further acceptance criteria, tests or evaluation techniques may be used in conjunction with the method of evaluating the curved surface of the first aspect in order to determine a final acceptance or rejection of a surface under evaluation. The further evaluation technique may comprise analysis to determine the presence of any peaks and/or troughs in the curvature plot.

The location of a plurality of points on the surface under evaluation may be measured and recorded. The plurality of locations on the surface under evaluation may be recorded as point cloud data.

In one embodiment, data representative of a plurality of locations on said surface under evaluation is processed using one or more curve modelling techniques so as to approximate a curve representative of a best fit through at least some of said points. A smoothing parameter may be applied to reduce the effect of any erroneously or inaccurately measured points.

One or more regions of interest of the surface may be defined and the method according to the present invention may be performed in respect of said regions of interest. The curve modelling, curvature determination and comparison may be performed for said one or more regions only.

The difference between the curvature of the higher or lower tolerance boundary and the surface profile under evaluation may be determined so as to provide a magnitude or degree to which a surface is to be rejected. The area under the curvature plot for the surface under evaluation and/or the area between the plot for the surface under evaluation and the higher or lower tolerance boundary may be determined.

The region of the surface under evaluation for which the curvature falls outside of the higher and lower tolerance boundaries may be determined and stored.

Data relating to the method of evaluation may be stored in a data store for subsequent retrieval and interrogation. Evaluation data for a plurality of surfaces may be stored in order to allow common geometrical trends between bodies to be determined.

The method may comprise the step of displaying the graph of the curvature plots for the surface profile under evaluation and any or any combination of the desired surface curvature plot, the higher boundary curvature plot and/or the lower boundary curvature plot. A corresponding graphical display of the surface profile for the surface under evaluation may be generated. The graphical display may include any or any combination of the desired surface profile, the higher tolerance boundary surface profile and/or the lower tolerance boundary surface profile.

The evaluation method may form part of a manufacturing or quality control process in which evaluation data is communicated to upstream manufacturing or design stages.

According to a second aspect of the present invention there is provided a system of evaluating a curved surface, comprising: a data store for storing data representative of a desired surface profile; measuring apparatus for determining the location of a plurality of points on a surface under evaluation; and, an evaluation tool arranged to establish a surface profile for at least a portion of the surface under evaluation based on the determined location of said points, the evaluation tool being further arranged to determine the curvature of the surface under evaluation and to accept or reject the surface under evaluation based on a result of a comparison between said curvature and a higher and lower curvature tolerance boundary for at least the portion of the surface under evaluation, wherein the higher and lower curvature tolerance boundaries are determined based upon the desired surface profile.

According to a third aspect of the present invention there is provided a data carrier comprising machine readable instructions for operation of one or more processors to evaluate a curved surface by defining or receiving a desired surface profile for at least a portion of a desired curved surface, establishing a surface profile for a surface under evaluation based upon measured surface data, determining the curvature of the surface under evaluation at a plurality of locations on said surface profile, determining higher and lower curvature tolerance boundaries based upon the desired surface profile, and, rejecting the surface under evaluation if any of the determined curvature values are outside of the region between the higher and lower curvature tolerance boundaries.

Any features described above in relation to the first aspect of the invention may be applied to the second and third aspects.

One or more working embodiments of the present invention are described in further detail below by way of example with reference to the accompanying drawings, of which.

Figure 1:
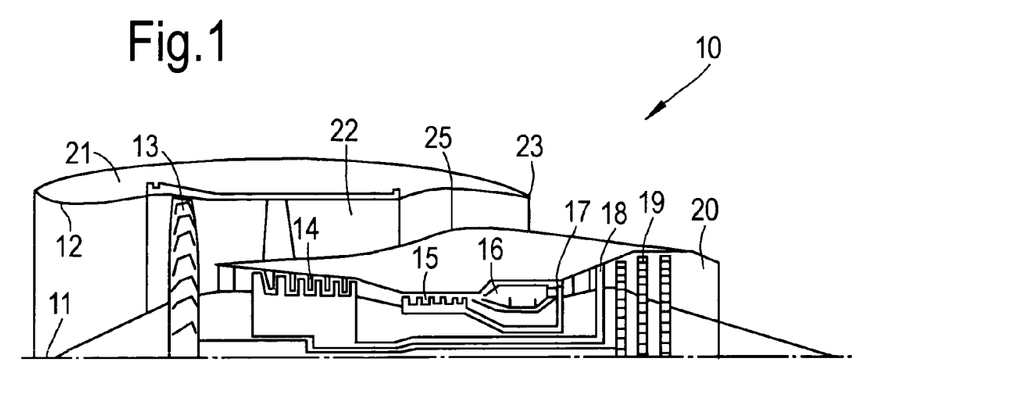
FIG. 1 shows a half longitudinal section schematic of a gas turbine engine according to the prior art.

With reference to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core engine exhaust nozzle 20. A nacelle 21 generally surrounds the engine 10 and defines the intake 12, a bypass duct 22 and a bypass exhaust nozzle 23.

The gas turbine engine 10 works in a conventional manner so that air entering the intake 11 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

The fan 13, compressors 14, 15 and turbines 17, 18 and 19 typically comprise annular arrays of large fan blades and smaller compressor and turbine blade rotors, such blades normally being interspaced by annular arrays of static aerodynamic guide vanes or stators. The rotor blades and stator vanes are aerofoil shaped and must conform to an intended design within acceptable tolerance limits.

An embodiment of the present invention is described with reference to a compressor blade from within the gas turbine engine 10. However it will be appreciated that the present invention may be applied to any rotor blade or stator vane within the engine or else any curved surface, the geometry of which merits accurate evaluation. For clarity, the blade 24 may be considered an example of any body having such a curved surface and will hereinafter be referred to as body 24.

Figure 2:
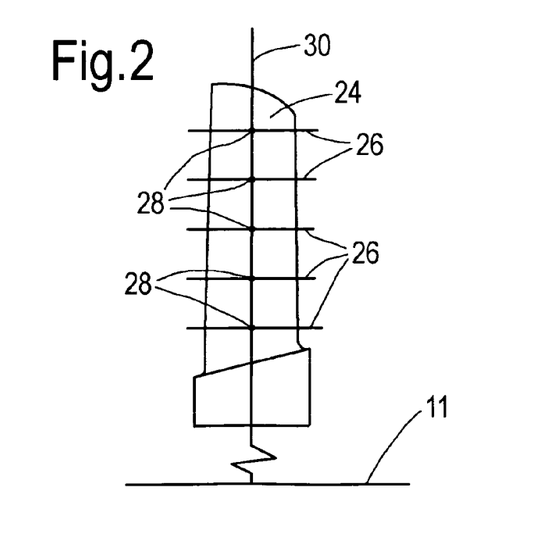
FIG. 2 shows a side view of a blade to be evaluated according to the selection process of the present invention.

Turning now to FIG. 2, there is shown a body 24 which is aerofoil in section along at least part of its length. In order to inspect the body for evaluation, the location of the surface of the body is determined at a plurality of points about a body section 26. This is typically achieved using one or more probes which determine the location of the body surface at tens of points about the section 26. Conventional techniques and equipment for achieving such measurements are known in the art and include contact probes, non-contact probes and other forms of visual or surface inspection devices.

In this embodiment of the present invention the method of determining the location of points about a surface section is repeated for a number of sections 26 at spaced locations 28 along a stacking axis 30 of the body 24 under inspection. The evaluation of the geometry of the body surface at any or any combination of those sections 26 may be carried out as described below in relation to FIGS. 2 to 6 for the purpose of analysing and accepting or rejecting the body.

Figure 3:
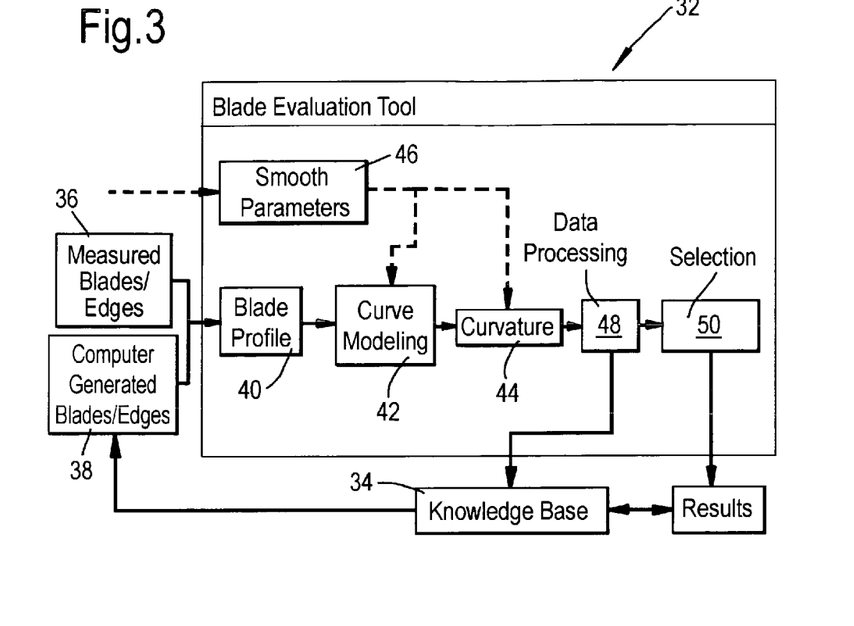
FIG. 3 shows the fundamental steps undertaken according to one embodiment of the present invention.

Turning now to FIG. 3, there is shown the general steps performed by a body evaluation tool 32 in order to determine the acceptability of the body surface under inspection. The tool 32 comprises machine readable instructions arranged to control the operation of one or more processors in order to process data relating to the body surface under evaluation and thereby decide whether or not the body meets with predetermined criteria. As will be understood, the one or more processors comprise sufficient random access memory (RAM) to allow data handling manipulation as described below.

The tool may also comprise a non-volatile memory for associated data storage and retrieval. In this embodiment, the tool communicates with a data storage device 34, referred to as a knowledge base in FIG. 2, which may be made available on a network for access by multiple tools 32. In an alternative embodiment, the non-volatile memory 34 may be associated with the tool 32 and may be integrated into the hardware thereof.

The knowledge base 34 provides for storage of data relating to the acceptance or rejection criteria for bodies of interest. The knowledge base contains acceptance criteria for known body shapes as well as previously measured or generated body shapes. The knowledge base may serve as a library of body shapes and evaluation results such that the performance of the tool over time can be monitored. Access to the knowledge base is typically restricted such that a password or other authorisation means may be required to store new or master body shapes therein.

Data representative of the one or more measured section profiles 26 of the body 24 is communicated to the tool 32 at step 36. In, addition, data representative of the nominal or desired surface profile is communicated to the tool at step 38. In this embodiment, the desired surface profile data is derived from a computer generated model of the body or the surface portion under evaluation, such as data associated with a CAD model. Alternatively, the desired surface profile may be derived from a previously inspected and evaluated body which adequately reflects the desired surface profile.

The steps carried out by the evaluation tool can be divided into pre-processing, processing and classification/selection stages. The pre-processing stage includes use of mathematic algorithms for preparing the data as will be described below in relation to steps 40 to 46 in readiness for the main processing stage 48. The main processing stage 48 extracts the relevant blade characteristics from a curvature graphic. These stages are carried out under predetermined sentencing criteria. The selection/classification stage involves the use of a pattern matching algorithm to determine whether the body is accepted or rejected. The tool allows for an automated acceptance/rejection decision that is entirely objective, and which avoids the need for visual assessment by the operator or inspector.

Figure 4A:
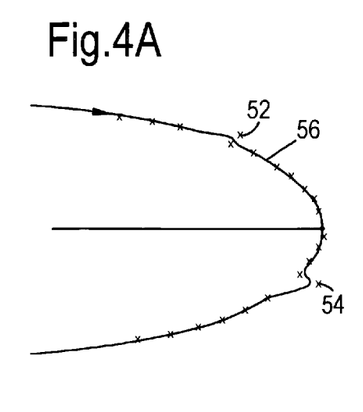
FIGS. 4A and 4B show respective surface estimations before and after a parametric smoothing process.
Figure 4B:
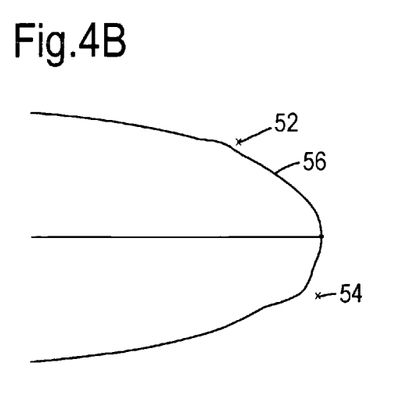
Figure 5:
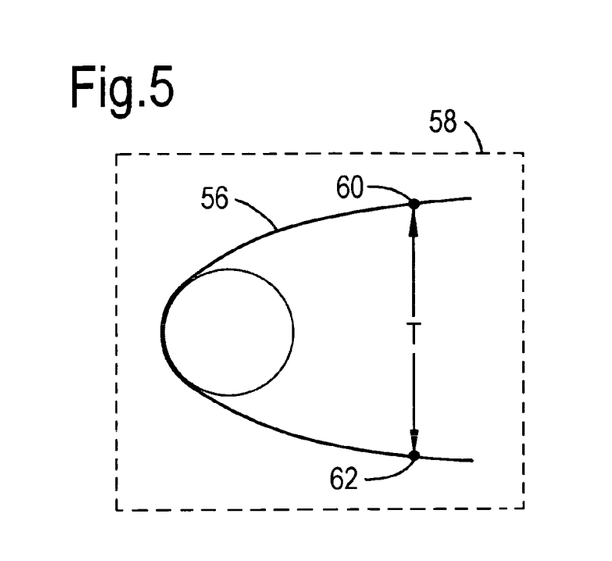
FIG. 5 shows a section view of the curved surface portion under evaluation.

The particular measurement method and process used to record the surface geometry of the body will determines the format in which the information will be recorded and will thus impact on the algorithms to be used in the pre-processing stage. In this case, the body surface geometry is captured as point cloud data, which contains the coordinate positions of the surface at the measured points. These points define a transverse slice or section of the body, exemplary portions of which are shown in FIGS. 4 and 5.

The relevant body surface coordinate data is read by the tool at step 40 to provide a measured body section or profile. A region of interest of the body section or profile is selected for evaluation. In the case of aerofoils, this would typically comprise the leading or trailing edge due to the impact of those portions on the overall aerodynamic performance of the blade.

A curve modelling method is adopted at step 42 in order to render the blade profile under assessment independent of the possible variations in point distance and to ensure comparability between different measured blades in the downstream data processing 48 and classification/selection 50 stages.

The curve modelling method is typically based on a parametric polynomial of $3^{rd}$ order or higher. In the case of, for example, cubic polynomials, it will be appreciated to the skilled person that various methods of curve modelling are available such as by way of Hermite, Bezier or B-Spline curve definitions. In this embodiment, a uniform non-rational B-Spline (UNRBS) modelling method has been adopted as it allows for continuity of curvature between a plurality of defined points.

Turning now to FIG. 4a, it can be seen that for real surface measurements, there exists the possibility of inaccuracy of point data, for example due to a relatively high signal to noise ratio. In such instances, it can be seen that individual points, such as for example points 52 and 54 can strongly influence the profile of the curve 56 generated by the tool. Accordingly, a parameter for smoothing of the generated curves has been implemented in order to reduce the detrimental impact of outlying points 52, 54 as can be seen in FIG. 4b.

In order to achieve suitable curve smoothing, the control points used for generation of the curve are selected as a subset of the total measured points. A predetermined length between the points is used as the criteria to determine which points are used for curve generation and which are rejected. This process is well suited to the present situation since the polynomial is generated with reference to points of defined spacing and so the appropriate predetermined length can be extracted as necessary.

Turning now to step 44, the curvature of the body profile is determined at a number of points. The curvature may be defined as the change in direction of the profile per unit length. The value of curvature for a straight line is zero and for a circle is the inverse of its radius. In other curves this value may vary between point on the curved and describes the deviation from a straight line in the immediate adjacency of the point. In the case of a plane curve the curvature may be defined as the change in the angle of inclination, α, of the curve relative to arc length, s, as follows:

$$\kappa = \left|\frac{d\alpha}{ds}\right|$$

Where the curve is defined in a plane containing x and y axes and α is the angle formed between a tangent to the curve and the x axis:

$$\kappa = \left|\frac{d\alpha}{ds}\right| = \left|\frac{\frac{d\alpha}{dt}}{\frac{ds}{dt}}\right| = \left|\frac{\frac{d\alpha}{dt}}{\sqrt{\left(\frac{dx}{dt}\right)^2 + \left(\frac{dy}{dt}\right)^2}}\right| = \left|\frac{\frac{d\alpha}{dt}}{\sqrt{(x')^2 + (y')^2}}\right| \quad (1)$$

$$\tan\alpha = \frac{dy}{dx} \quad (2)$$

$$= \frac{\frac{dy}{dt}}{\frac{dx}{dt}}$$

$$= \frac{y'}{x'} \Rightarrow \frac{d(\tan\alpha)}{dt}$$

$$= \sec^2\alpha \cdot \frac{d\alpha}{ds}$$

$$= \frac{x' \cdot y'' - x'' \cdot y'}{x'^2}$$

$$\frac{d\alpha}{ds} = \frac{1}{\sec^2\alpha} \cdot \frac{d(\tan\alpha)}{dt} \quad (3)$$

$$= \frac{1}{1 + \tan^2\alpha} \cdot \frac{x' \cdot y'' - x'' \cdot y'}{x'^2}$$

$$= \frac{1}{1 + \frac{y'^2}{x'^2}} \cdot \frac{x' \cdot y'' - x'' \cdot y'}{x'^2}$$

$$= \frac{x' \cdot y'' - x'' \cdot y'}{x'^2 + y'^2}$$

and therefore $$\kappa = \left|\frac{x' \cdot y'' - x'' \cdot y'}{(x'^2 + y'^2)^{3/2}}\right| = \left|\frac{y''}{(1 + y'^2)^{3/2}}\right|$$

A number of methods are available for calculating the curvature at relevant points along the region of interest of the body profile. Two such methods are described briefly below by way of example and are referred to as the 'Instantaneous Curvature' and the 'Circle Fit' methods.

The Instantaneous Curvature method is based on the curvature equation for plane curves as described above, and the polynomial created by B-Spline (UNRBS) method. The B-Spline algorithm returns for every set of selected points a polynomial, which describes the curve position for each axis (x, y, z) as a function of the arc length. As the curvature equation requires a polynomial description of the axis positions, it is possible to develop a curvature polynomial for every set of selected points.

For point data $P_n$ and vector $Q(t)$, which is made up of 3 cubic polynomials related to the parameter t, a curvature polynomial can be derived as follows:

$$Q(t) = \begin{bmatrix} x(t) \\ y(t) \\ z(t) \end{bmatrix}, \quad P_n = \begin{bmatrix} x_n \\ y_n \\ z_n \end{bmatrix}$$

$$\kappa = \left|\frac{x' \cdot y'' - x'' \cdot y'}{(x'^2 + y'^2)^{3/2}}\right|$$

$$x(t) = (1-t)^3 \cdot x_1 + (3t^3 - 6t^2 + 4) \cdot x_2 + (-3t^3 + 3t^2 3t + 1) \cdot x_3 + t^3 \cdot x_4$$

$$y(t) = (1-t)^3 \cdot y_1 + (3t^3 - 6t^2 + 4) \cdot y_2 + (-3t^3 + 3t^2 + 3t + 1) \cdot y_3 + t^3 \cdot y_4$$

A benefit of this approach is that the determination of curvature bears little dependence on point density and that the curvature value is estimated directly from a description of the points rather than through a fitting process, which avoids the need for iterative processes and the possible convergence problems associated therewith.

One of a number of possible alternative methods of calculating the curvature is the Circle Fit method based on a least squares approach. In least squares (LS) estimation, the unknown values of the parameters, $\beta_0, \beta_1, \ldots \beta_n$, in the regression function, $f(\vec{x}; \vec{\beta})$, are estimated by finding numerical values for the parameters that minimize the sum of the squared deviations between the observed responses and the functional portion of the model. Mathematically, the least (sum of) squares criterion that is minimized to obtain the parameter estimates is $$Q = \sum_{i=1}^{n} [y_i - f(\vec{x}_i; \vec{\beta})]^2$$

$\beta_0, \beta_1, \ldots \beta_n$ estimates of the parameter values are not the same as the true values of the parameters. $\beta_0, \beta_1, \ldots \beta_n$ are treated as the variables in the optimization and the predictor variable values, $x_1, x_2, \ldots$ are treated as coefficients. For nonlinear models, the least squares minimization is typically done using iterative numerical algorithms.

Based on this description and on the assumption, that the curvature at a given point P has a magnitude equal to the reciprocal of the radius of an osculating circle (a circle that closely touches the curve at the given point, the centre of which shapes the curve's evolute) an algorithm was written using the measured points to fit a circle, and use the circle radius to calculate the curvature of the middle point of this region.

Whilst the circle fit method does allow for curvature calculation, it has been found that this method is dependent on the point density because the quality of the circle fitting is dependent on the number of points selected and on the number of points for describing a determined area. Thus a higher point density is typically required for sharper edges, where curvature varies significantly over a relatively short arc or chord length.

As shown in FIG. 3, a smoothing parameter 46 may also be applied to the curvature values so as to reduce any noise. For this purpose, a parameter can be used which is similar in concept to the smoothing parameter applied to the body surface profile as described above. That is to say, it is not necessary to take the curvature value at every point but instead to use fewer points (for example, four points) of a pre-determined length. The length, which is used for the smoothing process, is the distance between every point.

In the event that the polynomial used to define the curve was already smoothed, then the curvature will also be smoothed and an additional smoothing process would not be required. In the alternative, the smoothing parameter can be applied to only the curvature values, such that the blade edge shape will be altered as a result.

A degree of manual control of the pre-processing stages 40-46 is envisaged, although the entire process can be automated, for example by determination and application of parameters based on the minimization of the shape error and/or curvature noise.

Figure 6:
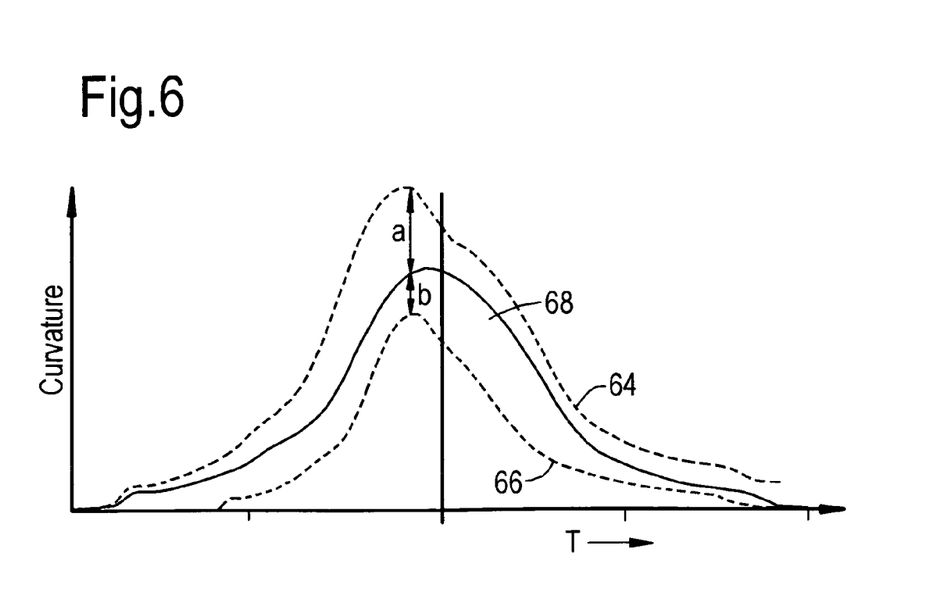
FIG. 6 shows a plot of curvature against a reference thickness for a nominal profile, an upper tolerance band and a lower tolerance band.
Figure 7:
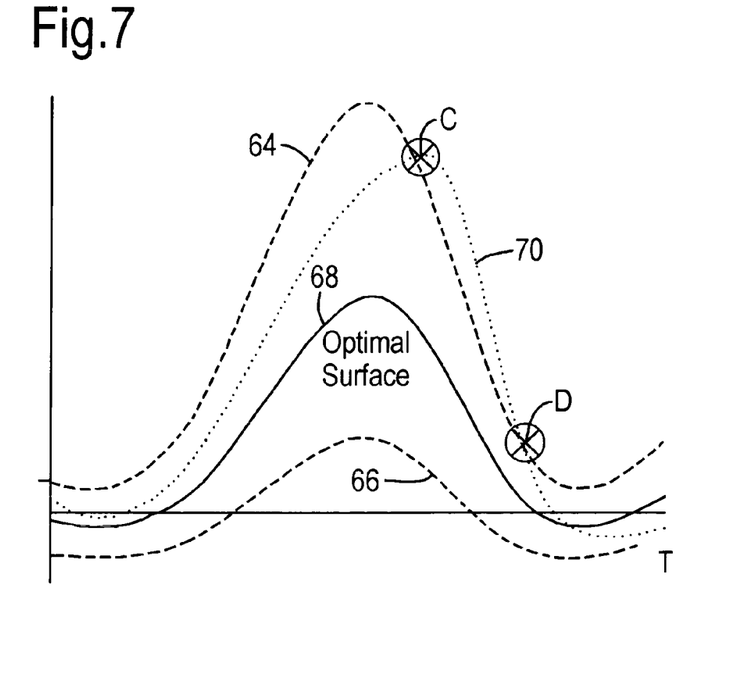
FIG. 7 shows a plot of a measured surface curvature juxtaposed against the nominal curvature and the upper and lower tolerance curvature bands.

Turning to FIGS. 5 to 7, the data processing stage 48 is performed on the area of interest 58 of the curve profile 56. Data for the master or nominal profile against which the measured surface 56 is to be compared may be obtained directly from the knowledge base 34 or else may be obtained from the relevant available Computer Aided Design (CAD) files for the body at 38. Such CAD data may need to be passed through the pre-processing steps 40-46 as described above or else may be obtained directly during data processing in the event that the data format is compatible. The nominal profile is intended to represent the ideal or preferred body shape.

In FIG. 5, a start point 60 and end point 62 of the region to be evaluated are defined. A reference value T is also determined, which in this example takes the form of a linear dimension between start and end points. In this case, the value T is the thickness of the body between the start and end points 60, 62. However it would also be possible to use an alternative characteristic length value, such as the arc or chord length to similar effect. The arc length can be derived for intervals between points via integrals or else by determining the hypotenuse of every interval using standard trigonometric relationships. All references below to the value T or the characteristic length encompass such alternatives.

Having determined the start and end points and the characteristic length, the software tool proceeds with the comparison of the measured body surface to the nominal body shape by comparison of the curvature of those surfaces. In order to achieve this, the curvature for each surface profile is plotted against the reference value T. More particularly, the software determines upper and lower acceptance limits based on the optimal surface profile and then determines whether the measured surface falls within those limits.

FIG. 6 shows an example of upper 64 and lower 66 tolerance bands relative to the curvature plot for the nominal surface profile 68. The value 'a' represents the difference in curvature between the upper curvature tolerance band 64 and the nominal surface profile and value 'b' represents the difference in curvature between the lower curvature tolerance band 66 and the nominal surface profile 68. It can be seen that the values of a and b typically vary with changes to the reference value T. Thus a greater tolerance may be allowable in the areas of relatively high curvature or relatively high rate of change of curvature, and conversely a lower tolerance may be allowable where the curvature or rate of change of curvature is relatively lower.

In order to obtain the upper 64 and lower 66 tolerance bands from the nominal curvature plot 68, a number of methods may be adopted.

In a simple example, a single parameter may be used to obtain the upper and lower limits from the nominal curvature values. This may be achieved by applying a scaling factor or parameter to the nominal curvature. The proposed scaling parameter is based on the difference between the maximum allowable curvature value ($Y_{mac}$) and the maximum curvature value for the nominal surface profile ($Y_{mc}$) as follows:

$$Y_{UPPER} = Y_{NOMINAL} + Y_{NOMINAL} \cdot \left[ \frac{(Y_{max} - Y_{mc})}{Y_{mc}} \right]$$

and $$Y_{LOWER} = Y_{NOMINAL} - Y_{NOMINAL} \cdot \left[ \frac{(Y_{max} - Y_{mc})}{Y_{mc}} \right]$$

However in the present embodiment, it was found that it was preferable to use a plurality of parameters to obtain the desired upper and lower limits from the nominal curvature plot. A total of four parameters were used as follows:

(1) The curvature scaling parameter as described above (2) A curvature offset parameter is used to shift the curvature plot in the X or Y axis direction. Thus a fixed constant offset value was applied to all points in the nominal curvature plot so as to translate the plot by a required value, in this case, in the Y-axis direction.

(3) A skewness parameter was used to alter the position of the points in the nominal plot relative to the X axis so as to bias the curvature plot either towards or away from the Y axis. The new X value of the points once so adjusted may be defined by:

$$X_{new} = X_{current} + \text{Skewness} \cdot \cos\left(\frac{\pi}{2} \cdot (2 \cdot X_{current} - 1)\right)$$

(4) An X-scaling parameter was used to scale the X axis positions of the points in the nominal curvature plot. The X axis value of the points may be adjusted in a manner similar to the curvature scaling parameter described above. However it is preferable that the resulting plot is not skewed at a peak or point of maximum curvature. Accordingly the new X value, using an X-scaling parameter defined as a percentage, may be defined as follows:

$$X_{new} = X_{current} \pm \frac{\text{scaling}}{100}(X_{current} - X_{peak})$$

For a curvature plot having multiple peaks then one peak value will be applied to points closest to one peak, whilst a further peak value will be applied to points closest to the further peak.

In addition to the above parameter definitions, it will be appreciated that modification of the nominal curvature plot to obtain an upper and/or lower curvature plot may require separate handling of the different surface portions of a body. For the example of an aerofoil, independent manipulation of the nominal curvature plot may be applied to the pressure and suction surfaces of the aerofoil.

In other embodiments of the present invention it will be appreciated that any or any combination of the above parameters or other suitable transformations could be used to generate the required higher and lower tolerance band curvature plots.

In an alternative embodiment, where a library of previously accepted or rejected body surfaces is available, for example by way of the knowledge base 34, a user could generate tolerance bands manually by prescribing a line which encompasses previously accepted body surfaces whilst excluding previously rejected body surfaces.

Once the higher and lower tolerance bands 64, 66 have been generated, they are plotted along with the optimal curvature plot 68 and the plot of the curvature for the measured body surface 70. An example of the resulting graphic is shown in FIG. 7. The acceptance or rejection of the measured surface is determined by assessing whether the plot of curvature for the measured surface 70 lies within the bounds of the upper 64 and lower 66 tolerance bands.

As can be seen in FIG. 7, the section of the measure surface plot 70 between points C and D falls outside of the region between the upper and lower tolerance bands. Accordingly the measured surface in this instance is rejected. Rejection of the body results from a determination that the measure surface curvature plot 70 crosses the upper or lower tolerance bands in one or more locations, in this case at points C and D.

Whilst it is likely that the curvature of the vast majority of bodies to be rejected will cross the upper or lower tolerance bands at some point on the graphic, it is a possibility that the measure plot may lie completely outside the upper and lower tolerance bands. Accordingly it is preferable to determine whether the measured curvature plot 70 has a curvature value which is greater than the upper tolerance band 64 or below the lower tolerance band 66 for any value of the reference value T in the region under evaluation.

An indication of the severity of the failure of a body can be obtained by calculating the area contained between the measured plot 70 and the upper or lower tolerance band for which the measured plot is outside of the acceptable region. This can provide useful engineering information indicative of failures which are indicative of a potential fault or else those failures which are to be expected under standard manufacturing tolerances. Additionally or alternatively, the areas under the optimal curvature plot and the measured surface curvature plot may be determined and compared in order to provide further information regarding the form of the measured surface.

In addition, details of the reference value (T) range for which the measured curvature plot 70 falls outside the acceptable range can be determined and stored such that a user can assess the region of the body surface under evaluation which has resulted in rejection of the body. This region can then be displayed on the graphic of the measured surface, for example as shown in FIGS. 4 and 5, such that the user can visually appreciate the erroneous region. Comparison between the erroneous regions for a number of rejected bodies can be undertaken to determine and quantify any trends in rejected parts.

At 50 the acceptance or rejection decision and the graphic of the plots are output for display to a user on screen and for storage. The point data for the plots in the graphic and the data representative of acceptance or rejection of the body as well as the accompanying parameters used in the pre-processing and/or processing stages are output for storage and for subsequent retrieval by a user or by the evaluation tool.

The above description focuses on the plotting of true curvature against thickness or arc length for the area of interest. It is also possible to modify plots for example so as to non-dimensionalize the curvature by application of a parameter such as the thickness or arc length. The thickness or arc length values may be converted for plotting, for example, such that they represent a normalised value between 0 and 1.

As will be appreciated, the surface profile evaluation is repeated for the plurality of measured section profiles 26, as shown by way of example in FIG. 2.

Figure 8:
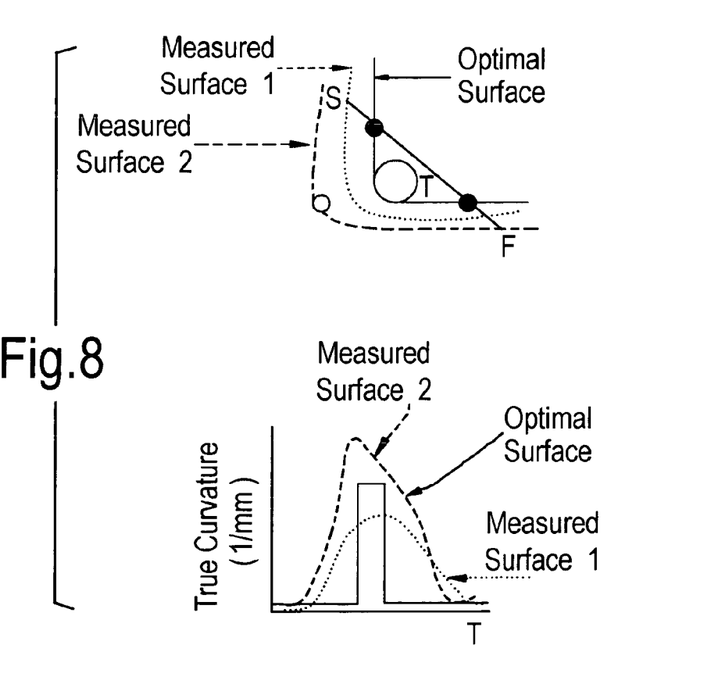
FIG. 8 shows two exemplary measured surfaces and their associated curvature plots; and, FIG. 9 shows details of further parameterisation techniques which may be used to assess a surface curvature plot according to a further embodiment of the invention.

FIG. 8 shows further examples of post processing which can be achieved so as to display curvature plots of optimal and measured surfaces along with their associated surface profile plots. Such plots provide invaluable information to the design engineer and can be used to determine important design parameters such as:

(1) The apex point is defined as the position, where a camber line crosses the surface profile. This point divides an aerofoil surface profile into two sections, the suction and pressure side, and is used to assess bias.

(2) The symmetry parameter represents the symmetry of a body surface and is evaluated calculating the difference between using the area under the curvature plot on either side of the apex point.

(3) The Max:Mean relation parameter represents the variation of a surface profile from the nominal-shaped edge and is determined by the ratio between the maximum curvature value and mean value.

(4) Peak positions can be defined by regions of the reference value T for which the curvature is greater than 80% of the maximum curvature value.

(5) Flatness can be determined by a region on the curvature plot having a negative derivative followed by a subsequent region having a positive derivative.

(6) Cavities are determined by a region in which the curvature becomes negative.

Any or any combination of the above-listed parameters or conditions may be used in conjunction with the above-described curvature plot assessment in order to determine the acceptance or rejection of a body surface.

Figure 9:
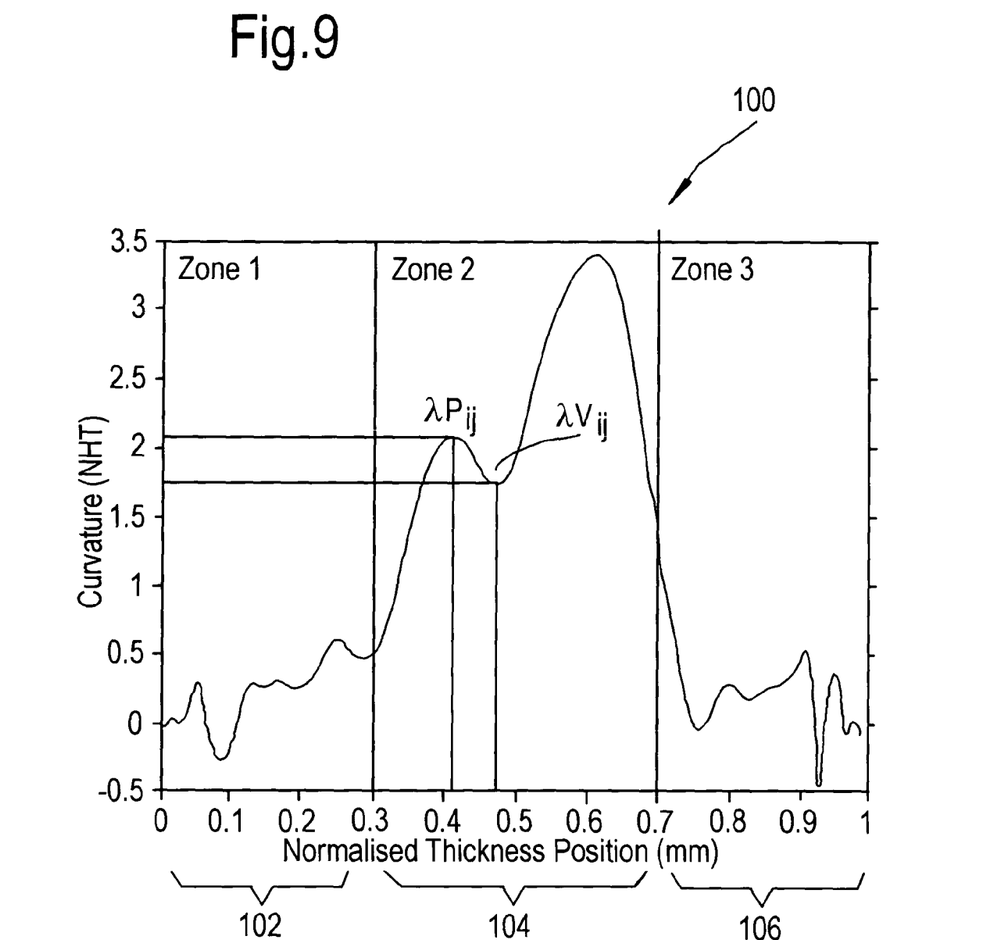

Turning now to FIG. 9 there is shown an additional or alternative method of assessing the surface in question. The steps carried out in relation to FIG. 9 may be carried out by way of post-processing steps or else concurrently with the methods described above in order to reach an acceptance or rejection decision regarding the surface profile.

Upon performing assessments according to the present invention, it has been determined that it is possible for unwanted surface profiles to fall within tolerance boundaries show in FIGS. 6 and 7. For example, an undesirable shape could have two or more peaks in curvature as shown in FIG. 9 but still be entirely contained within the acceptance curvature tolerance bands. Whilst FIG. 9 shows a specific example, it is to be noted that there are a significant number of variant types of unwanted surface profiles which may be identified by unwanted features in a curvature plot. Tight control of manufacturing processes mean that such profiles are generally unlikely to occur. However it is of significant benefit to the tool of the present invention to be all-encompassing such that the need for additional human intervention is minimised.

In order to achieve this, additional parameters are defined with respect to the curvature plot as will be described below.

The curvature plot 100 as shown in FIG. 9 is first divided into a plurality of regions or zones. In this example, the zones 102, 104 and 106 are used such that the surface is divided into three regions relative to the normalised thickness of the surface. Zone 102 is from 0 to 0.3; zone 104 is from 0.3 to 0.7; and, zone 106 is from 0.7 to 1.0.

For each zone there are a number of variables which can be set by the user. When the variables are tested a value of 1 or 0 is attributed to them dependent on whether they pass or fail a test. A final vector is then used to pass or fail the shape as will be described below. This pass or fail decision is then fed into the final tolerance assessment. That is to say, in this embodiment, both the curvature tolerancing and also the parameter assessments must result in a pass in order for the surface to be accepted. In Boolean logic terms, an AND relationship between the curvature tolerancing and parameter assessments is required for an acceptance of a surface. In further embodiments it is possible to attribute different weights for each assessment such that one assessment is more determinative in the final acceptance or rejection of a surface.

In the parameterisation of the zones 102-106, two variables were defined for extracting information on the peaks and troughs (or valleys) from the curvature plot as follows:

$\lambda P_{ij}$ where P defined a "peak" with subscript $_i$ referring to a "zone" and subscript $_j$ an "incremental counter".

$\lambda V_{ij}$ where P defined a "valley" with subscript $_i$ referring to a "zone" and subscript $_j$ an "incremental counter".

For zone 104 extra variables were derived by extracting the (xp,yp) coordinates of $\lambda P_{ij}$ and (xv,yv) of $\lambda V_{ij}$ as follows:

$$Area_{ij} = abs((xp_{ij} \times yp_{ij+1} - xp_{ij+1} \times yp_{ij}) + (xv_{ij} \times yp_{ij} - xp_{ij} \times yv_{ij}) + (xp_{ij+1} \times yv_{ij} - xv_{ij} \times yp_{ij+1}))/2$$

The Area parameter is important since it accounts for a situation in which a "peak valley peak" shape in the curvature plot occurs. This translates to a flat section along the leading edge surface and/or a rapid change (inflection point) in curvature. This parameter would pick up "defects" that could be acceptable by the tolerance assessment.

A set of rules was developed to generate an outputs associated with $\lambda P_{ij}$, $\lambda V_{ij}$ such that those parameters can be used in automated assessment of a surface as follows:

TABLE 1

Zone 102 variables and rules

| Variable | Rule | Output if true | Output if false |
|---|---|---|---|
| $\lambda P_{11}$ (Yp4) | >1 | 1 | 0 |
| $\lambda P_{12}$ ( ) | N/A | N/A | N/A |
| $\lambda V_{11}$ (Yv4) | <−0.3 | 1 | 0 |

TABLE 2

Zone 104 variables and rules

| Variable | Rule | Output if true | Output if false |
|---|---|---|---|
| $\lambda P_{21}$ (Yp3) | >1.5 | 0 | 1 |
| $\lambda P_{22}$ (Yp1) | N/A | N/A | N/A |
| $Area_{21}$ | >0.04 | 0 | 1 |
| $Area_{22}$ | >0.04 | | |
| $\lambda V_{21}$ | <1.5 | 1 | 0 |

TABLE 3

Zone 3 variables and rules

| Variable | Rule | Output if true | Output if false |
|---|---|---|---|
| $\lambda P_{31}$ (Yp5) | >1 | 1 | 0 |
| $\lambda P_{32}$ ( ) | N/A | N/A | N/A |
| $\lambda V_{31}$ (Yv5) | <−0.3 | 1 | 0 |

Each variable output from the three zones was used as an input to a sentencing vector S using the following expression:

$$S = ([\lambda P_{11}] + [\lambda V_{11}] + [\lambda P_{21}] + [Area_{ij}] + [\lambda P_{31}] + [\lambda V_{31}])$$

The table below summarises the output of the sentencing vector S. The conditions for the vector S output were set in the following way:

If S=0, the airfoil passed the assessment
If S>0, the airfoil failed the assessment Thus the output of the rules defined above can automatically provide a further acceptance criterion to that of the curvature tolerancing, by way of sentencing vector, S. Dependent on the type of surface under assessment, the parameters and/or rules defined for those parameters may be adapted to capture desirable or undesirable surface characteristics which are specific to the intended use of the surface. For example, the aerodynamic leading edge considerations for a fan blade of a gas turbine engine may differ from other types of aerofoil or hydrofoil components.

The evaluation of the body according to the present invention may be used as part of a wider manufacturing and/or testing process. The results may be used as a quality control measure and may provide for a process improvement feedback loop to manufacturing and/or engineering design.

The invention claimed is:

1. A method of accepting or rejecting a curved surface of a body under evaluation, comprising:
   defining a desired surface profile for at least a portion of a desired surface;
   determining a surface profile for at least a portion of the surface under evaluation;
   determining the curvature of the surface under evaluation at a plurality of locations on said surface profile;
   determining higher and lower curvature tolerance profiles based upon the desired surface profile, the region between the higher and lower curvature tolerance boundaries defining a range of acceptable curvature values; and
   comparing the surface profile to the higher and lower tolerance profiles and rejecting the surface under evaluation if any of the determined curvature values are outside of the range of acceptable curvature values for said locations.

2. A method according to claim 1, wherein the determining of the curvature of the surface profile under evaluation comprises defining the curvature at the plurality of locations with reference to a reference variable for the body.

3. A method according to claim 2, wherein the reference variable comprises a linear geometric dimension of at least a portion of the body or surface under evaluation.

4. A method according to claim 2, wherein the curvature of the surface profile under evaluation is plotted against the reference variable so as to produce a graph, wherein the higher and lower curvature tolerance profiles are plotted on the graph.

5. A method according to claim 4, wherein the comparison is carried out by determining whether the curvature plot for the surface profile under evaluation lies within the area bounded by the higher and lower tolerance profile plots.

6. A method according to claim 5, wherein the surface profile is rejected if a portion of the curvature plot for the surface under evaluation lies outside of the area bounded by the higher and lower tolerance profile plots.

7. A method according to claim 5, wherein the surface profile is accepted if the curvature plot for the surface under evaluation lies within the area bounded by the higher and lower tolerance profile plots.

8. A method according to claim 1, wherein the curvature of the higher tolerance profile and the lower tolerance profile is determined for a plurality of locations on the desired surface profile, said locations determined based upon the plurality of locations for the surface under evaluation.

9. A method according to claim 8, wherein the surface under evaluation is accepted if its curvature at the plurality of locations falls between the corresponding higher and lower curvature tolerance values for each of said locations and is rejected if the curvature of the surface under evaluation is outside of the range between the higher and lower curvature tolerance values for any of said locations.

10. A method according to claim 1, wherein the location of a plurality of points on the surface under evaluation is measured and recorded using measuring apparatus.

11. A method according to claim 10, wherein data representative of the location of the plurality of points on the surface under evaluation is processed using one or more curve modelling techniques so as to approximate a curve profile defining a best fit through at least some of said points.

12. A method according to claim 11, wherein a smoothing parameter is applied to said approximated curve profile.

13. A method according to claim 1, wherein upon rejection of the surface under evaluation, the locations on the rejected surface for which the curvature falls outside of the higher and lower tolerance profiles is determined and stored.

14. A method according to claim 1, wherein evaluation data for a plurality of surfaces is stored for subsequent interrogation in order to allow common surface trends between evaluated bodies to be determined.

15. A method according to claim 1, comprising generating and displaying on a display a graph of curvature plots for the surface profile under evaluation, the higher and the lower tolerance profile.

16. A method according to claim 1, further comprising:
defining one or more parameters indicative of a shape characteristic of a curvature plot or profile for the surface under evaluation; and,
rejecting the surface under evaluation if one or more of said parameters fail predetermined criteria for the surface.

17. A method according to claim 16, wherein the parameters are indicative of the presence of one or more peaks and/or troughs within the curvature profile for the desired surface.

18. A method according to claim 16, wherein acceptance of a surface under evaluation requires both:
that the determined curvature values are within of the range of acceptable curvature values for said locations; and,
that said parameters meet predetermined criteria for the surface.

19. A system of evaluating a curved surface, comprising:
a data store for storing data representative of a desired surface profile;
measuring apparatus for determining the location of a plurality of points on a surface under evaluation; and
an evaluation tool arranged to establish a surface profile for at least a portion of the surface under evaluation based on the determined location of said points,
the evaluation tool being further arranged to determine the curvature of the surface under evaluation and to accept or reject the surface under evaluation based on a result of a comparison between said curvature and a higher and lower curvature tolerance boundary for at least the portion of the surface under evaluation, wherein the higher and lower curvature tolerance boundaries are determined based upon the desired surface profile.

20. A data carrier comprising machine readable instructions for operation of one or more processors to evaluate a curved surface by:
defining or receiving a desired surface profile for at least a portion of a desired curved surface;
establishing a surface profile for a surface under evaluation based upon measured surface data;
determining the curvature of the surface under evaluation at a plurality of locations on said surface profile;
determining higher and lower curvature tolerance profiles based upon the desired surface profile; and
rejecting the surface under evaluation if any of the determined curvature values are outside of the region between the higher and lower curvature tolerance boundaries.

* * * * *